United States Patent
Chang et al.

(10) Patent No.: US 8,766,127 B2
(45) Date of Patent: Jul. 1, 2014

(54) TOUCH SENSOR

(75) Inventors: Chia-Chiang Chang, Taoyuan County (TW); Ta-Hsin Chou, Hsinchu (TW); Wen-Tung Hsu, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 154 days.

(21) Appl. No.: 13/620,200

(22) Filed: Sep. 14, 2012

(65) Prior Publication Data

US 2013/0277195 A1    Oct. 24, 2013

(30) Foreign Application Priority Data

Apr. 18, 2012   (TW) .............................. 101113723 A

(51) Int. Cl.
*H03K 17/975*    (2006.01)

(52) U.S. Cl.
USPC .......................................... 200/600; 345/174

(58) Field of Classification Search
USPC ................... 200/600; 345/174, 173
See application file for complete search history.

(56) References Cited

U.S. PATENT DOCUMENTS

| | | | |
|---|---|---|---|
| 7,084,933 B2 | 8/2006 | Oh et al. | |
| 2008/0277259 A1* | 11/2008 | Chang | 200/600 |
| 2008/0309635 A1* | 12/2008 | Matsuo | 345/173 |
| 2009/0002337 A1* | 1/2009 | Chang | 345/174 |
| 2011/0090175 A1 | 4/2011 | Mamba et al. | |
| 2011/0181548 A1 | 7/2011 | Sekiguchi | |
| 2012/0159780 A1* | 6/2012 | Chan et al. | 29/832 |

FOREIGN PATENT DOCUMENTS

TW    201106051    2/2011

OTHER PUBLICATIONS

David S. Hecht et al., "Emerging Transparent Electrodes Based on Thin Films of Carbon Nanotubes, Graphene, and Metallic Nanostructures," Advanced Materials, Apr. 2011, pp. 1482-1513, vol. 23, Wiley, US.
M. H. Yang, "Principles, Structures and Materials of Projected Capacitive Touch Panels," www.materialsnet.com.tw, Jun. 2010, pp. 158-166, Taiwan.
C. H. Chiang, "Estimate of New Transparent Conductive Oxide Material Application in Touch Panel (I)," www.materialsnet.com.tw, . Nov. 2011, pp. 81-86, Taiwan.
Vivek Subramanian et al.," Solution-Processed Zinc Oxide Transistors for Low-Cost Electronics Applications," Journal of Display Technology, Dec. 2009, pp. 525-530, vol. 5, No. 12, IEEE, US.

* cited by examiner

*Primary Examiner* — Kyung Lee

(57) ABSTRACT

A touch sensor is provided. The touch sensor includes a first buffer layer disposed on a substrate, a first electrode layer disposed on the first buffer layer, a second buffer layer disposed on the first electrode layer and a second electrode layer disposed on the second buffer layer and electrically connected with the first electrode layer, wherein the first and second buffer layers are formed of the same material including an insulated metal oxide, and the first and second electrode layers are formed of the same material including a doped metal oxide.

10 Claims, 3 Drawing Sheets

US 8,766,127 B2

TOUCH SENSOR

CROSS REFERENCE TO RELATED APPLICATIONS

This Application claims priority of Taiwan Patent Application No. 101113723, filed on Apr. 18, 2012, the entirety of which is incorporated by reference herein.

BACKGROUND

1. Technical Field

The technical field relates to a touch sensor, and more specifically to structures of a touch sensor.

2. Description of the Related Art

Recently, touch sensors have been popularly applied in various electronic products, such as a mobile phone, a personal digital assistant (PDA) and a handheld personal computer, in which, the fabrication technologies of capacitive touch sensors have been most popularly used. Currently, the structure of a single-glass typed capacitive touch sensor is the major structure used for the touch sensors.

For conventional single-glass typed capacitive touch sensors, the material for forming a touch sensing electrode layer is usually indium tin oxide (ITO). An ITO layer is directly formed on a glass substrate by sputtering and then patterned to form patterns of the touch sensing electrode layer. The patterns of the touch sensing electrode layer include X-axis sensing electrode patterns and Y-axis sensing electrode patterns, in which, one axis of the sensing electrode patterns uses a conductive layer to form a bridge structure across another axis of the sensing electrode patterns. An insulating layer is formed at the locations of the X-axis sensing electrode patterns and the Y-axis sensing electrode patterns crisscrossing with each other for electrically isolating the X-axis sensing electrode patterns from the Y-axis sensing electrode patterns. In the conventional single-glass typed capacitive touch sensors, the material of the conductive layer for forming the bridge structure is usually a metal and the material of the insulating layer for electrically isolating the X-axis sensing electrode patterns from the Y-axis sensing electrode patterns is usually silicon dioxide.

SUMMARY

One embodiment provides a touch sensor, comprising: a substrate; a first buffer layer disposed on the substrate; a first electrode layer disposed on the first buffer layer; a second buffer layer disposed on the first electrode layer; and a second electrode layer disposed on the second buffer layer. The second electrode layer is electrically connected with the first electrode layer. The material of the first buffer layer is the same as that of the second buffer layer. The material of the first electrode layer is the same as that of the second electrode layer. The materials of the first buffer layer and the second buffer layer comprise an insulated metal oxide. The materials of the first electrode layer and the second electrode layer comprise a doped metal oxide.

A detailed description is given in the following embodiments with reference to the accompanying drawings.

BRIEF DESCRIPTION OF THE DRAWINGS

The disclosure can be more fully understood by reading the subsequent detailed description and examples with reference to the accompanying drawings, wherein.

DETAILED DESCRIPTION

Figure 1:
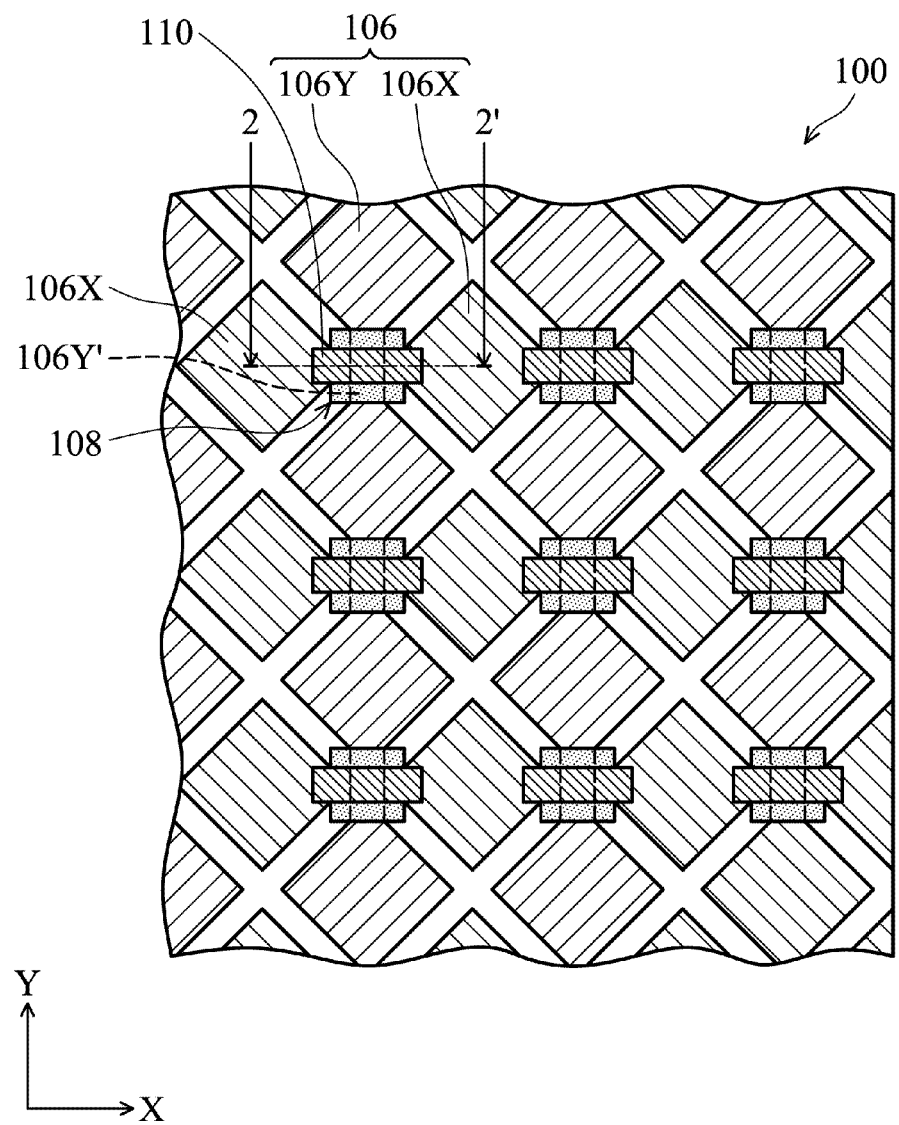
FIG. 1 shows a partial plane view of a touch sensor according to an embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Referring to FIG. 1, a partial plane view of a touch sensor 100 according to an embodiment is shown. The touch sensor 100 includes a first electrode layer 106. The pattern of the first electrode layer 106 includes a plurality of first touch sensing electrode patterns 106X arranged along a first direction for example an X-axis direction to form a plurality of rows. The first touch sensing electrode patterns 106X are separated from each other along the X-axis direction. The pattern of the first electrode layer 106 further includes a plurality of second touch sensing electrode patterns 106Y arranged along a second direction perpendicular to the first direction, for example a Y-axis direction, to form a plurality of columns. The second touch sensing electrode patterns 106Y are connected with each other through a connection portion 106Y' along the Y-axis direction. Any two adjacent first touch sensing electrode patterns 106X are electrically connected with each other through a bridge structure formed of a second electrode layer 110. The bridge structure formed of the second electrode layer 110 is formed across the connection portion 106Y' between any two adjacent second touch sensing electrode patterns 106Y. Further, an insulating structure formed of a second buffer layer 108 is disposed between the connection portion 106Y' of the second touch sensing electrode patterns 106Y and the bridge structure formed of the second electrode layer 110. The portions of the rows of the first touch sensing electrode patterns 106X crossing the columns of the second touch sensing electrode patterns 106Y are electrically isolated from each other through the insulating structure formed of the buffer layer 108.

Figure 2:
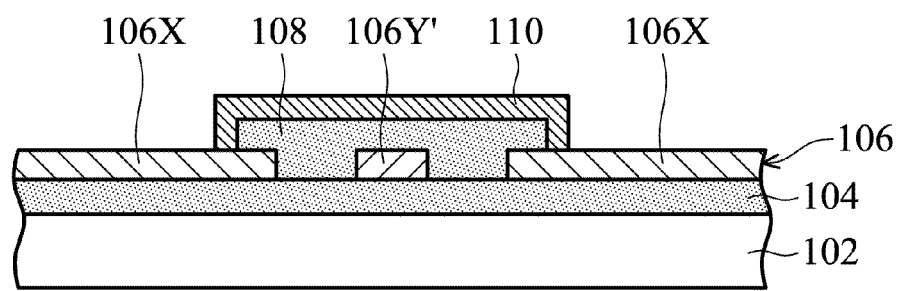
FIG. 2 shows a partial cross section view of a touch sensor along a cross section line 2-2' of FIG. 1 according to an embodiment.

Referring to FIG. 2, a partial cross section view of the touch sensor 100 along a cross section line 2-2' of FIG. 1 according to an embodiment is shown. As shown in FIG. 2, the touch sensor 100 includes a substrate 102, for example a transparent glass substrate or a flexible transparent plastic substrate. In an embodiment, firstly, a first buffer layer 104 is formed on the substrate 102 to completely cover the substrate 102. The material of the first buffer layer 104 may be an insulated metal oxide, for example zinc oxide (ZnO). The first buffer layer 104 can be formed by a plasma-enhanced chemical vapor deposition (PECVD) or a sputtering process. In one embodiment, the first buffer layer 104 may have a thickness of about 100 nm.

The first electrode layer 106 is formed on the first buffer layer 104. The material of the first electrode layer 106 may be a doped metal oxide, for example gallium (Ga) doped zinc oxide (GZO). A doped metal oxide material layer of the first electrode layer 106 can be deposited on the first buffer layer 104 by a plasma-enhanced chemical vapor deposition (PECVD) or a sputtering process and then the doped metal oxide material layer is patterned by a photolithography and etching process to form the pattern of the first electrode layer 106.

According to the embodiment, the first buffer layer 104 formed of ZnO can be used as a seed layer for depositing the first electrode layer 106 formed of gallium doped zinc oxide (GZO). The resistance of the first electrode layer 106 is reduced by the first buffer layer 104. In a comparative example, a gallium doped zinc oxide (GZO) layer with a thickness of about 100 nm was directly deposited on a glass substrate. The sheet resistance of the GZO layer of the comparative example was about 600Ω/□. In one embodiment, a ZnO layer with a thickness of about 100 nm was firstly deposited on a glass substrate, and then a gallium doped zinc oxide (GZO) layer with a thickness of about 100 nm was deposited on the ZnO layer. The sheet resistance of the GZO layer of the embodiment was about 203Ω/□. Comparing the sheet resistance of the embodiment with the sheet resistance of the comparative example, the ZnO layer formed on the glass substrate 102 as the first buffer layer 104 and then the GZO layer formed on the ZnO layer as the first electrode layer 106 in the embodiment can significantly reduced the sheet resistance of the first electrode layer 106. It helps for improving the electrical properties of the touch sensor 100.

In an embodiment, the pattern of the first electrode layer 106 includes a plurality of first touch sensing electrode patterns 106X arranged along a first direction for example an X-axis direction to form a plurality of rows. The first touch sensing electrode patterns 106X are separated from each other along the X-axis direction. The pattern of the first electrode layer 106 further includes a plurality of second touch sensing electrode patterns 106Y arranged along a second direction perpendicular to the first direction, for example a Y-axis direction, to form a plurality of columns. The second touch sensing electrode patterns 106Y are connected with each other through a connection portion 106Y' along the Y-axis direction. There are some spaces formed between the first touch sensing electrode patterns 106X and the connection portion 106Y' of the second touch sensing electrode patterns 106Y.

Next, a second buffer layer 108 is formed on the first electrode layer 106. The second buffer layer 108 is partially disposed on the first electrode layer 106 as an electrically isolated structure between the connection portion 106Y' of the second touch sensing electrode patterns 106Y and a subsequently formed second electrode layer 110. Furthermore, the second buffer layer 108 is formed to fill the spaces between the first touch sensing electrode patterns 106X and the connection portion 106Y' of the second touch sensing electrode patterns 106Y. According to the embodiment, the material of the second electrode layer 110 may be an insulated metal oxide, for example zinc oxide (ZnO). The material of the second buffer layer 108 may be the same as the material of the first buffer layer 104. The second buffer layer 108 can be formed by a PECVD or a sputtering process. The thickness of the second buffer layer 108 needs to be enough to have good step coverage ability to the first electrode layer 106. In one embodiment, the second buffer layer 108 may have a thickness of about 100 nm or more than 100 nm.

The second buffer layer 108 can be used as the electrically isolated structure between the connection portion 106Y' of the second touch sensing electrode patterns 106Y and the subsequently formed second electrode layer 110. Furthermore, the second buffer layer 108 also can be used as a seed layer of the subsequently deposited second electrode layer 110. The second electrode layer 110 is formed on the second buffer layer 108. According to the embodiment, the material of the second electrode layer 110 may be a doped metal oxide, for example gallium (Ga) doped zinc oxide (GZO). The material of the second electrode layer 110 may be the same as the material of the first electrode layer 106. A doped metal oxide material layer of the second electrode layer 110 can be deposited on the second buffer layer 108 by a PECVD or a sputtering process and then the doped metal oxide material layer is patterned by a photolithography and etching process to form the pattern of the second electrode layer 110. According to the embodiment, the second buffer layer 108 formed of ZnO can significantly reduce the resistance of the second electrode layer 110. It helps for improving the electrical properties of the touch sensor 100.

Figure 3:
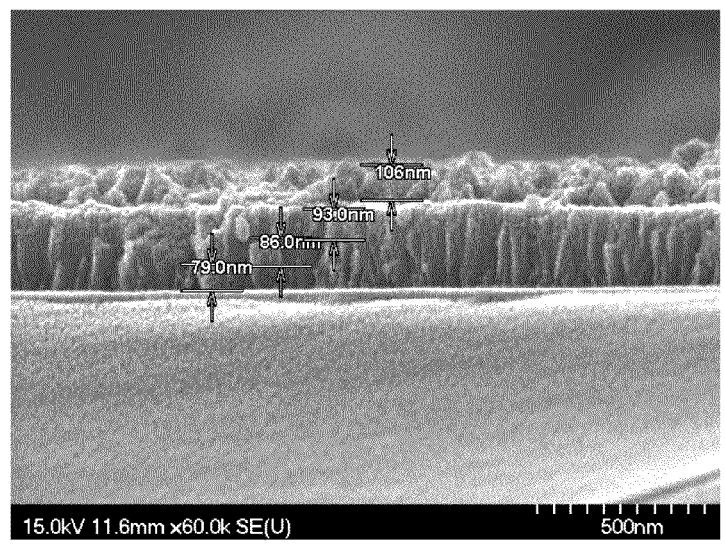
FIG. 3 shows a scanning electron microscope (SEM) photograph of a partial cross section of a touch sensor according to an embodiment.

In the embodiment, the base materials of the first buffer layer 104, the first electrode layer 106, the second buffer layer 108 and the second electrode layer 110 all belong to a metal oxide system, such as zinc oxide. The difference between the materials of the first and second buffer layers 104 and 108 and the materials of the first and second electrode layers 106 and 110 is that the materials of the first and second electrode layers 106 and 110 are a doped metal oxide, such as gallium (Ga) doped zinc oxide (GZO). Therefore, the materials of forming the various layers of the touch sensor 100 have the same or a similar optical property such as a refractive index. The reflection of a light passing through each layer of the touch sensor 100 is small, such that the light transmission of the touch sensor 100 is enhanced while compared with the light transmission of the conventional touch sensor. From a cross section view, in the embodiment, there is almost no interface between each layer of the touch sensor 100, i.e. between the first buffer layer 104, the first electrode layer 106, the second buffer layer 108 and the second electrode layer 110. As shown in FIG. 3, FIG. 3 is a scanning electron microscope (SEM) photograph of a partial cross section of the touch sensor 100 according to an embodiment. The SEM photograph of FIG. 3 shows the second electrode layer 110, the second buffer layer 108, the first electrode layer 106, the first buffer layer 104 and the substrate 102 of the touch sensor 100 from top to bottom. The materials of the second electrode layer 110, the second buffer layer 108, the first electrode layer 106, the first buffer layer 104 and the substrate 102 are GZO/ZnO/GZO/ZnO/glass, respectively. The thicknesses of the second electrode layer 110, the second buffer layer 108, the first electrode layer 106 and the first buffer layer 104 are 106 nm/93.0 nm/86.0 nm/79.0 nm, respectively. Because the base materials of the second electrode layer 110, the second buffer layer 108, the first electrode layer 106 and the first buffer layer 104 are substantially the same and the crystal directions of the materials of these layers are similar, the interfaces between the second electrode layer 110, the second buffer layer 108, the first electrode layer 106 and the first buffer layer 104 are not visible in the SEM photograph of FIG. 3. These interfaces are difficult to observe in the SEM photograph of FIG. 3.

According to the embodiment, the difference of refractive indexes (n value) between any two layers of the first buffer layer 104, the first electrode layer 106, the second buffer layer 108 and the second electrode layer 110 is less than 1, preferably is less than 0.5. Thus, the transmission of light passing through the touch sensor 100 is enhanced while compared with a conventional touch sensor. A light transmission of the touch sensor of one embodiment is about 89% measured by a spectrometer.

The touch sensor 100 of the embodiment does not require the forming of any extra optical matching material layer, such as an index matching material layer, and enhancement of the light transmission of the touch sensor 100 can be achieved.

According to the embodiment, the materials of the first buffer layer 104 and the second buffer layer 108 are an insulated metal oxide, for example zinc oxide. When the insulated metal oxide is doped, for example doping with gallium (Ga) into zinc oxide, an electrically conductive material is formed, which can be used as the materials of the first electrode layer 106 and the second electrode layer 110. The resistance of the material of the first buffer layer 104 and the second buffer layer 108 is about 100 to 10000 times the resistance of the material of the first electrode layer 106 and the second electrode layer 110. In one embodiment, a doping concentration of gallium (Ga) in zinc oxide may be about 1 to 10%.

In addition, the first buffer layer 104, the first electrode layer 106, the second buffer layer 108 and the second electrode layer 110 all can be formed by an all atmospheric pressure PECVD process. Therefore, the fabrication processes of the touch sensor 100 can be simplified.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A touch sensor, comprising:
   a substrate;
   a first buffer layer disposed on the substrate;
   a first electrode layer disposed on the first buffer layer;
   a second buffer layer disposed on the first electrode layer; and
   a second electrode layer disposed on the second buffer layer and electrically connected with the first electrode layer,
   wherein the materials of the first buffer layer and the second buffer layer are the same, the materials of the first electrode layer and the second electrode layer are the same, the materials of the first buffer layer and the second buffer layer comprise an insulated metal oxide, and the materials of the first electrode layer and the second electrode layer comprise a doped metal oxide.

2. The touch sensor as claimed in claim 1, wherein the metal oxide used for the first buffer layer and the second buffer layer is the same as the metal oxide used for the first electrode layer and the second electrode layer.

3. The touch sensor as claimed in claim 1, wherein the materials of the first buffer layer and the second buffer layer comprise zinc oxide, and the materials of the first electrode layer and the second electrode layer comprise a gallium-doped zinc oxide.

4. The touch sensor as claimed in claim 1, wherein a resistance of the first buffer layer and the second buffer layer is 100 to 10000 times a resistance of the first electrode layer and the second electrode layer.

5. The touch sensor as claimed in claim 1, wherein the first buffer layer is a seed layer for forming the first electrode layer.

6. The touch sensor as claimed in claim 1, wherein the first buffer layer is a seed layer for forming the first electrode layer, and the second buffer layer is an insulating layer between the first electrode layer and the second electrode layer.

7. The touch sensor as claimed in claim 1, wherein the first electrode layer comprises:
   a plurality of first touch sensing electrode patterns arranged along a first direction and separated with each other; and
   a plurality of second touch sensing electrode patterns arranged along a second direction perpendicular to the first direction and connected with each other.

8. The touch sensor as claimed in claim 7, wherein the second electrode layer comprises a bridge structure for electrically connecting to any two adjacent first touch sensing electrode patterns.

9. The touch sensor as claimed in claim 1, wherein the first buffer layer is completely disposed on the substrate and the second buffer layer is partially disposed on the first electrode layer.

10. The touch sensor as claimed in claim 1, wherein the differences in refractive indexes between the first buffer layer, the first electrode layer, the second buffer layer and the second electrode layer are less than 1.

* * * * *